(12) United States Patent
Maturi

(10) Patent No.: US 7,012,913 B2
(45) Date of Patent: Mar. 14, 2006

(54) APPARATUS, AND ASSOCIATED METHOD, FOR FACILITATING COMMUNICATION OF UNFRAGMENTED PACKET-FORMATTED DATA IN A RADIO COMMUNICATION SYSTEM

(75) Inventor: Jagadish Maturi, San Diego, CA (US)

(73) Assignee: Nokia Corporation, Espoo (FI)

( * ) Notice: Subject to any disclaimer, the term of this patent is extended or adjusted under 35 U.S.C. 154(b) by 117 days.

(21) Appl. No.: 10/723,438

(22) Filed: Nov. 25, 2003

(65) Prior Publication Data

US 2005/0111437 A1    May 26, 2005

(51) Int. Cl.
*H04J 3/24*    (2006.01)
*H04L 12/28*    (2006.01)

(52) U.S. Cl. .................. 370/349; 370/392; 370/474

(58) Field of Classification Search ............... 370/349, 370/252, 392, 400, 465–468, 474
See application file for complete search history.

(56) References Cited

U.S. PATENT DOCUMENTS

| | | | | |
|---|---|---|---|---|
| 5,442,633 | A * | 8/1995 | Perkins et al. | 370/389 |
| 5,892,753 | A * | 4/1999 | Badt et al. | 370/233 |
| 5,959,974 | A * | 9/1999 | Badt et al. | 370/233 |
| 6,185,210 | B1 * | 2/2001 | Troxel | 370/397 |
| 6,272,148 | B1 * | 8/2001 | Takagi et al. | 370/469 |

* cited by examiner

*Primary Examiner*—Ricky Ngo
*Assistant Examiner*—Andy Lee
(74) *Attorney, Agent, or Firm*—Alston & Bird LLP

(57) ABSTRACT

Apparatus, and an associated method, for determining an allowable packet size of data packets communicated by a mobile host to a correspondent host. Path MTU discovery is performed at a network-based proxy on behalf of the mobile host. Once the path MTU is determined, an ICMPTv6 message is sent to the mobile host to inform the mobile host of the allowable packet size.

19 Claims, 4 Drawing Sheets

APPARATUS, AND ASSOCIATED METHOD, FOR FACILITATING COMMUNICATION OF UNFRAGMENTED PACKET-FORMATTED DATA IN A RADIO COMMUNICATION SYSTEM

The present invention relates generally to a manner by which to facilitate communication of packet-formatted data in a radio communication system in unfragmented form. More particularly, the present invention relates to apparatus, and an associated method, by which to determine, at a network part of the radio communication system, on behalf of a mobile host that is to send the packet-formatted data, a packet size that permits the packet-formatted data to be sent in unfragmented form to a correspondent host. Once determined, an indication of the permitted packet size is sent to the mobile host.

Because determination of the permitted packet size is performed at the network part and not at the mobile host, only minimal amounts of radio resources are needed to make the determinations. And, the computations required of a processing element of the mobile host are also minimal.

A network-based proxy is utilized to make determinations on behalf of the mobile host. An ICMPv6, or other appropriate, message is formed and sent to the mobile host that contains indications of the determinations. Packet-formatted data subsequently sent by the mobile host are of packet sizes selected responsive to the determinations.

BACKGROUND OF THE INVENTION

Modern communication systems are endemic throughout modern society. The need to communicate data is pervasive, and ready access to a communication system through which to communicate is regularly required. As additional communication services become available, the need to have ready access to a communication system to communicate therethrough to effectuate the additional communication services shall likely increase.

In general, a communication system includes a set of communication stations. At least one communication station of the set forms a sending station, and at least another communication station of the set forms a receiving station. Communication data is communicated by a sending station to a receiving station by way of a communication channel. The sending station converts, if necessary, the communication data into a form to permit its communication upon the communication channel, and the receiving station includes circuitry to provide for the recovery of the informational content of the communication data delivered thereto.

A radio communication system is a communication system in which the communication channel upon which the communication data is sent is defined upon a radio link extending therebetween. The communication channels are referred to as radio channels. Because the radio channels are defined upon radio links, the conventional need to form a wireline connection between communication stations to effectuate communications therebetween is obviated.

Because wireline connections are not required to be formed between communication stations, communications are effectable by way of a radio communication system between locations at which communications by way of a conventional wireline communication system would be inconvenient or impractical. Additionally, because no wireline connection is required to be formed with the communication stations, a radio communication system is amenable for implementation as a mobile communication system. In a mobile communication system, communication mobility is provided. That is to say, one or more of the communication stations of a mobile communication system is mobile and is not limited to operation at a fixed position.

A cellular communication system is a type of mobile communication system. The networks of various cellular communication systems have been deployed throughout large geographical areas of the populated portions of the world. A cellular communication system provides for telephonic communications, of both voice data and non-voice data. Successive generations of cellular communication systems have been developed and deployed. New-generation systems are currently being deployed and others are under development. For instance, standardization of so-called new generation (NG) systems and operating protocols are ongoing. In general, the new generation communication systems utilize digital communication techniques and communicate packet-formatted data. When packet-formatting is used, data is communicated in the form of data packets, sometimes utilizing shared communication channels.

Packet formatting protocols have also been standardized, and such protocols are used by which to format data packets that are communicated in a cellular communication system. A packet formatting protocol defines the format of a data packet. IP (Internet Protocol) formatting that is currently used is generally in conformity with a version 4 of the Internet Protocol, IPv4. A successor protocol, referred to as new generation protocol, IPng, has been standardized and is undergoing implementation. The new generation protocol is referred to as version 6, IPv6. Packet-formatted data, formatted pursuant to the IPv6 standard, is an evolutionary standard that is compatible with the IPv4 standard. IPv6-formatted data packets are of selectable lengths.

The length permitted of a data packet is limited by the maximum number of bytes of data that are permitted to be communicated in a single transmission, e.g., packet, on a communication length to a correspondent device. If a packet is transmitted that is too large to be delivered as a single packet to a correspondent device, the packet can be resent in fragmented form, i.e., as separate parts that are subsequently concatenated together. When a packet must be fragmented and retransmitted, however, increased processing loads are imposed upon entities associated with the communication of the data packet to the correspondent device. Additional problems, such as reduced throughput rates also result. To reduce the possibility that a data packet that is too large to be delivered successfully to a correspondent device, a path MTU (Maximum Transmission Unit) discovery procedure is carried out. In a path MTU discovery procedure, a procedure is carried out by which a determination is made of the maximum path MTU. And, when the path MTU is determined, the data packets that are subsequently formed are selected to be of lengths that do not exceed the length of the path MTU. The path MTUs might change as a result in changes of length configurations, and the path MTUs must be re-calculated, as needed.

The path MTU discovery procedure was first used for packet communications in conventional, wireline communication systems. While the same discovery procedure is amenable for implementation in a radio communication system, the conventional path MTU discovery procedure is relatively bandwidth consumptive, a problem in a bandwidth-constrained system, such as a cellular communication system.

If a manner could be provided by which better to perform a path MTU discovery procedure, or other analogous procedure, that requires less use of radio resources, better use could be made of the limited bandwidth available in a radio communication system.

It is in light of this background information related to packet radio communication systems that the significant improvements of the present invention have evolved.

SUMMARY OF THE INVENTION

The present invention, accordingly, advantageously provides apparatus, and an associated method, by which to facilitate communication of packet-formatted data in a radio communication system in unfragmented form.

Through operation of am embodiment of the present invention, a manner is provided by which to determine, at a network part of the radio communication system, on behalf of a mobile host that is to send the packet-formatted data, a packet-size that permits the packet-formatted data to be sent in unfragmented form by a sending host to a correspondent host. Once the packet size is determined at the network part, an indication of the permitted packet size is sent upon a radio channel to the mobile host.

A proxy is provided at the network part on behalf of the mobile host to perform the determination of the permitted packet size of data packets that are to be communicated by way of a link with a correspondent host. The permitted packet size is determined by the proxy, for instance, by sending sample packets to the correspondent host to determine the permitted packet size that can be sent by way of a link to the correspondent host. The initial size of the sample packet sent by the proxy is locally selected, i.e., a local maximum packet size or selected remotely, e.g., at the correspondent host, or the lesser of the two permitted packet sizes. A packet of the selected packet size is sent by the proxy to the correspondent host. If the packet of the selected size cannot be delivered to the correspondent host in unfragmented form, an error message is returned to the proxy. The error indicates that the selected packet size is too large. The proxy reselects the packet size to be of a reduced packet size. The process is repeated until the packet is delivered to the correspondent host without return of an error message. The packet size of the packet determined to have been delivered to the correspondent host defines the selected packet size.

A control message is formatted and populated with a value representative of the packet size determined by the proxy of which a packet is able to be communicated to the correspondent host in unfragmented form. The control message is sent by way of a radio channel to the mobile host. The mobile host detects the control message and extracts the values contained therein. The mobile host utilizes the extracted values to set a maximum packet length of packets formatted thereat for communication to the correspondent host.

Because the mobile host need not perform the determination procedure by which the allowable packet size is determined and such determinations are instead made by a network-positioned proxy entity, various advantages result. The sample packets that are formed and sent pursuant to the determination of the allowable packet size are sent by the network-positioned proxy device rather than the mobile host, reduced radio resources are required pursuant to the determination. And, because the processing associated with the determination is also performed at the proxy rather than at the mobile host, reduced energy consumption of the mobile host results. Also, limited available memory capacity at the mobile host need not be dedicated for the determination procedure.

The message generated at the network part, such as at the same proxy that determines the permitted packet size of packets that are to be communicated to a particular correspondent host by way of a particular link, includes an indication of the permitted packet size as well as an indication in the header part of the message of the message-type. That is to say, the message includes an indication in its header portion that the message contains, in its body, the permitted packet size. The message further includes, for instance, an identifier, such as the IP address, that identifies the correspondent host as well as the length by which the packet data is to be communicated thereto.

When utilizing the IPv6 protocol and an associated ICMPv6 protocol, a new ICMPv6 message is formed and communicated to the mobile host. The permitted packet size forms a path MTU (Maximum Transmission Unit) value that defines the maximum packet size that the mobile host can send to the correspondent host over a selected length without fragmentation of the packet. The ICMPv6 message is formatted in conventional manner to include a header part and a body part. The header part includes a type field that is populated with a value, such as 143, that identifies the message to be a message identifying the path MTU value associated with a particular correspondent host and communication length. In one implementation, the ICMPv6 message further includes path MTU values associated with other correspondent hosts or other communication links to indicate to the mobile host that receives the message the allowable packet sizes to be used pursuant to sending communication data packets to the associated correspondent host.

In another aspect of the present invention, a cache is maintained for storing values of the permitted packet sizes, such as the path MTUs that are discovered pursuant to a path MTU discovery (PMTU-D) procedure. The cache is maintained, for instance, together with the proxy at the network part or is maintained at the mobile host, or at both locations. The values stored at the cache, when embodied at the network part, are used, if needed, to populate the ICMP message or, if embodied at the mobile host, are used when the data packets are formatted to determine the size permitted of the packets.

In these and other aspects, therefore, apparatus, and an associated method, is provided for a packet radio communication system. The packet radio communication system is operable pursuant to an Internet Protocol (IP). And, the radio communication system has a mobile host and a network part. The mobile host communicates with at least a first correspondent host that is connected in communication connectivity with the network part. Communication of packet-formatted data is facilitated by the mobile host in unfragmented form. A network position determiner is operable responsive to initiation of communications by the mobile host. The network position determiner determines, on behalf of the mobile host, of at least a first packet size into which the packet-formatted data is permitted to be formed for communication to the at least the first correspondent host. The at least the first packet size determined by the network position determiner permits communication of the packet-formatted data in unfragmented form to the at least the first correspondent host.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
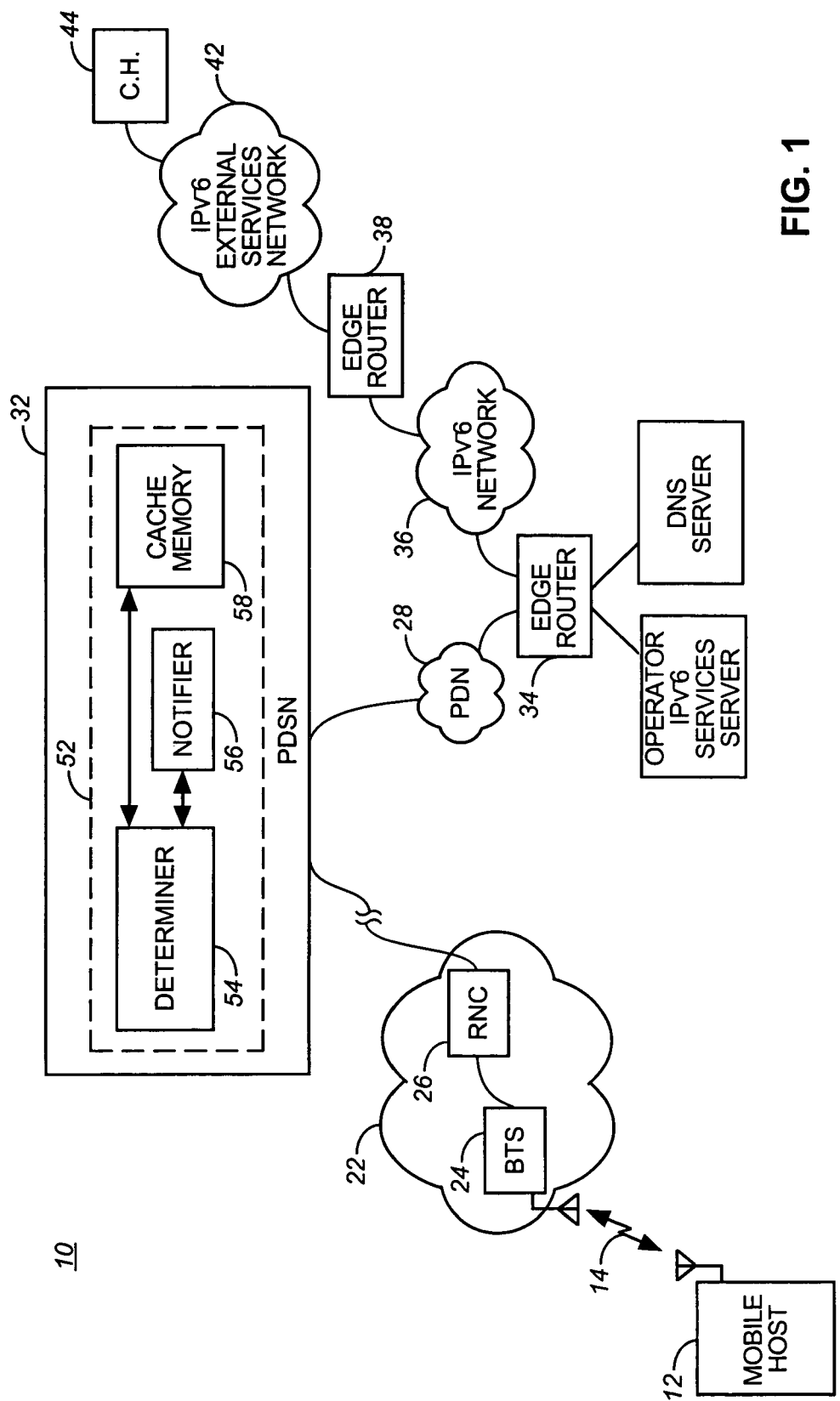
FIG. 1 illustrates a functional block diagram of a radio communication system in which an embodiment of the present invention forms a portion.

Referring first to FIG. 1, a radio communication system, shown generally at 10, provides for radio communications with, and by, mobile hosts, of which the mobile host 12 is representative. In the exemplary implementation, the communication system forms a cellular packet radio communication system that provides for IPv6 packet-formatted communications. While the following description shall describe exemplary operation of the present invention with respect to its implementation in a cellular packet radio communication system that utilizes IPv6 link layer protocol, the teachings of the present invention are analogously also implementable in other types of communication systems and operation of an embodiment of the present invention can analogously be described with respect to its implementation in other communication systems.

The communication system also includes a network part with which the mobile host communicates by way of radio channels defined upon radio links. The arrow 14 is representative of a radio link upon which radio channels are defined. Communication data, originated at the network part of the communication system is communicated upon downlink channels defined upon radio downlinks. And, communication data originated at the mobile host is communicated upon uplink channels defined upon radio uplinks. Packet-formatted data originated at the mobile host, for instance, is communicated upon uplink channels and detected at the network part, subsequently to be routed thereto to a destination.

The network part of the communication system includes a radio access network (RAN) portion 22. The radio access network portion includes a base transceiver station (BTS) 24 that includes radio transceiver circuitry capable of sending communication data to, and detecting communication data communicated by, the mobile host. While only a single base transceiver station is shown in the FIGURES in a typical radio access network, a plurality of spaced-apart base transceiver stations are utilized, each of which defines a coverage area referred to as a cell. The cells defined by the base transceiver stations collectably define the coverage area of the radio communication system. When a mobile host, such as the mobile host 12, is positioned within the coverage area defined by any of the cells associated with any of the base transceiver stations, communication data is able to be communicated between the mobile host and the network part of the communication system.

The radio access network portion 22 of the network part of the communication system includes other functional entities, such as a radio network controller (RNC) 26. The radio network controller is coupled to a group of base transceiver stations, of which the base transceiver station 24 is representative, and operates, amongst other things, to control operation of the base transceiver stations coupled thereto.

The network part of the communication system further includes a packet data network portion 28 to which the radio access network portion is coupled by way of a packet data service node (PDSN) 32. The packet data network portion forms a communication fabric through which communication data, here packet-formatted communication data, is communicated.

Various functional entities are coupled to, or form parts of, the packet data network. An edge router 34 is here shown to be coupled to the packet data network. The edge router performs routing functions to route packet-formatted communication data communicated during operation of the communication system. The router is coupled to an IPv6 network 36 and, by way of a router 38, to an IPv6 external services network 42 to which a correspondent host (CH) 44 is connected. The correspondent host is an IPv6 host.

A communication path is formable between the mobile host 12 and the correspondent host 44 through which to communicate packet-formatted data to effectuate a communication service. The communication system also includes a DNS (domain name service) server 46 and an operator Ipv6 services server 48, here at least functionally connected to the edge router 34.

As noted previously, data packets are preferably communicated in unfragmented form to reduce the need to retransmit fragments of the data packet. While existing proposals related to the IPv6 protocol provide for a path MTU discovery procedure, such procedure is performed by a sending host, here, e.g., the mobile host. As the path MTU discovery procedure utilizes the transmission of sample packets to determine the path MTU size, radio resources are required to be utilized each time in which a sample packet is communicated upon a radio channel defined upon a radio link. As the radio air interface that defines the radio link is typically bandwidth-constrained, there is an ongoing need to minimize the radio resources available upon the radio channels upon the radio link to the communication of the packet-formatted data.

Pursuant to an embodiment of the present invention, apparatus, here indicated by elements positioned within the block 52, is provided. The apparatus forms a proxy, on behalf of the mobile host, to perform the path MTU discovery procedure and to notify the mobile host of the permitted packet size determined therefrom, i.e., the path MTU. In the exemplary implementation, the apparatus is embodied at the packet data service node 32. In other implementations, the apparatus is embodied elsewhere. The functional entities forming the apparatus here include a determiner 54, a notifier 56, and a cache memory 58. The entities are functional and are implementable in any desired manner such as by algorithms executable by processing circuitry.

The determiner operates responsive to initiation of communications by the mobile host to initiate a communication session with a mobile host. The mobile host initiates communication, here, by the transmission of a DNS (Domain Name Server) inquiry that is communicated to the domain name server 46. Once routed to the domain name server, the domain name server determines an IP address associated with the correspondent host. And, the domain name server generates a response to indicate the IP address associated with the domain name contained in the request. When the response is delivered to the packet data service node, the response is intercepted by the apparatus 52, and the determiner commences operation to determine the path MTU by performing the path MTU discovery procedure.

In the exemplary implementation, the determinations made by the determiner are provided to the notifier 56 and also cached at the cache memory 58. Storing of the determined values of the permitted packet size at the cache memory permits its later retrieval, if needed.

The notifier operates to form an ICMPv6 message that is routed through the radio access network portion and sent to the mobile host to inform the mobile host of the path MTU size permitted of data packets subsequently to be formed and sent by the mobile host to the correspondent host. The message is also formatted to include the identity, such as by its IP address, of the correspondent host as well as the communication link for which the path MTU is associated. The mobile host, upon detection of the message, extracts the information therefrom, and formats data packets in conformity with the path MTU value. By constructing the data packets in conformity with the path MTU value, the data packets are able to be communicated, in unfragmented form, to the correspondent host.

Thereby, as the path MTU is determined at the network part of the communication system, not the mobile host, radio resources are conserved and the computational processing, otherwise required to be performed at the mobile host, is performed at the network part.

Figure 2:
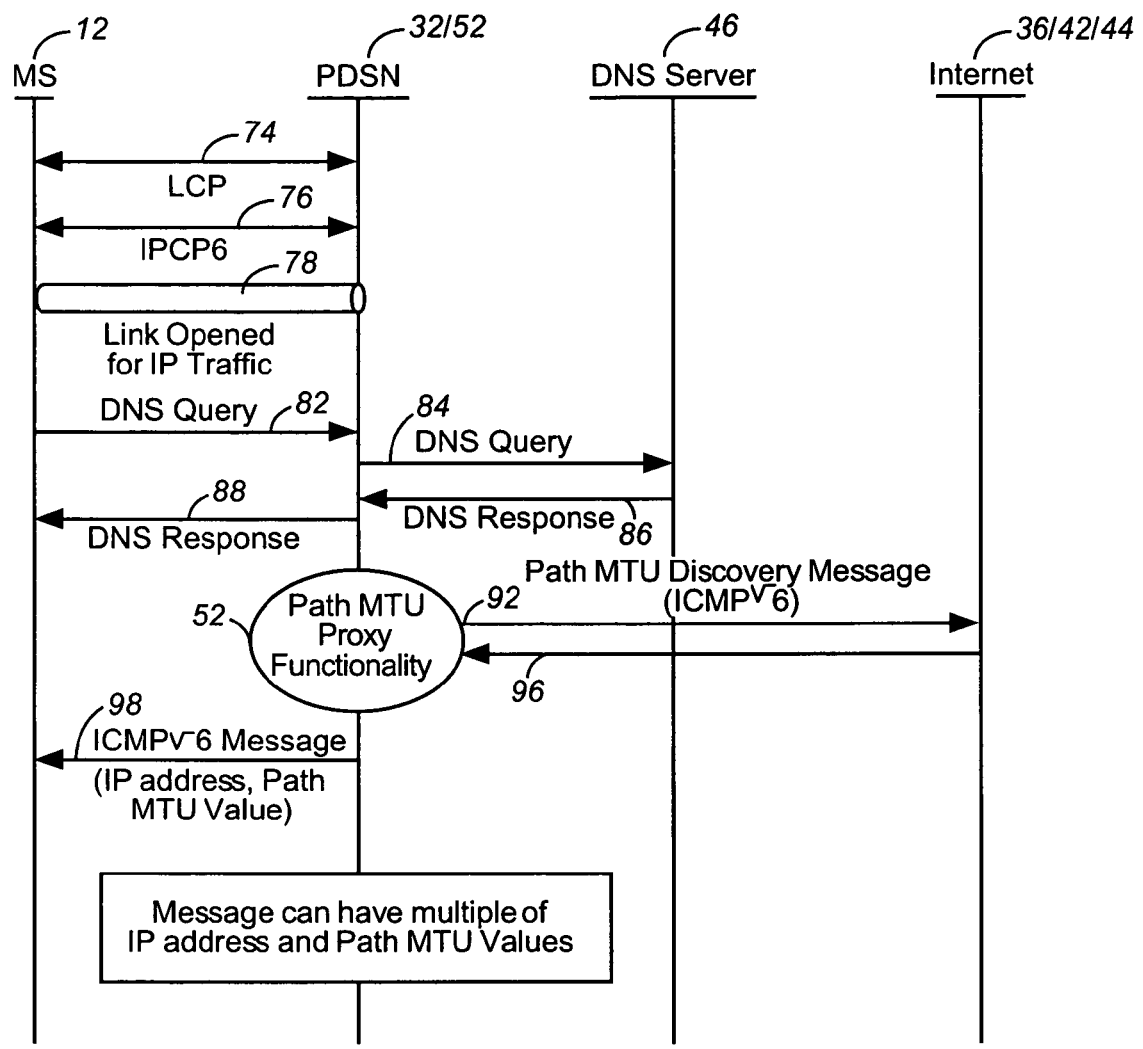
FIG. 2 illustrates a message sequence diagram representative of signaling generated during operation of the radio communication system shown in FIG. 1.

FIG. 2 illustrates a message sequence diagram, shown generally at 72, representative of the signaling generated during operation of the packet radio communication system 10 shown in FIG. 1. The operation and signaling generated is representative of operation of the communication system when communications are initiated by the mobile host 12 to send packet-formatted communication data to the correspondent host. The communication system operates pursuant to an embodiment of the present invention by which the path MTU is determined at the network part of the communication system rather than at the mobile host. By performing the path MTU discovery procedure at the mobile host, the radio resources that are required to carry out the path MTU discovery procedure are reduced.

First, and as indicated by the segments 74 and 76, LCP (Link Control Protocol) and IPCPv6 (Internet Protocol Command Protocol Six) procedures are carried out to form a link between the mobile host and the packet data service node 32. Responsive to the signaling, and as indicated by the block 78, the link is opened for the communication of packet-formatted data, here IP traffic.

When communication data is to be communicated by the mobile host to the correspondent host, the mobile host first generates and sends a DNS (Domain Name Source) query, indicated by the segment 82, to the packet data service node and, subsequently, routed, indicated by the segment 84, through the packet data network to the DNS server 46. The domain name server determines the IP address associated with the domain name contained in the DNS query and forms a DNS response, indicated by the segment 86, that is returned to the packet data service node. The apparatus 52 of an embodiment of the present invention intercepts the DNS response. And, the DNS response is also returned, indicated by the segment 88, to the mobile host.

The proxy function performed by the apparatus 52 includes performing the path MTU discovery procedure, here through the generation of the path MTU discovery messages sent, indicated by the segment 92, by way of a communication link to the correspondent host 44. Replies are generated and returned, indicated by the segment 96, indicative of whether a fragmentation error is generated, viz., indicating whether a sample packet previously sent is of a too large of a packet size.

The proxy further forms and sends a ICMPv6 message of an embodiment of the present invention, here indicated by the segment 98, to the mobile host. The message is formatted to include the path MTU value that is determined by the proxy together with the IP address as well as, if desired further, the communication link upon which the path MTU is determined, to the mobile host. The message is populated, in one implementation, with multiple values of path MTU values and associated multiple numbers of IP addresses and multiple communication links.

Figure 3:
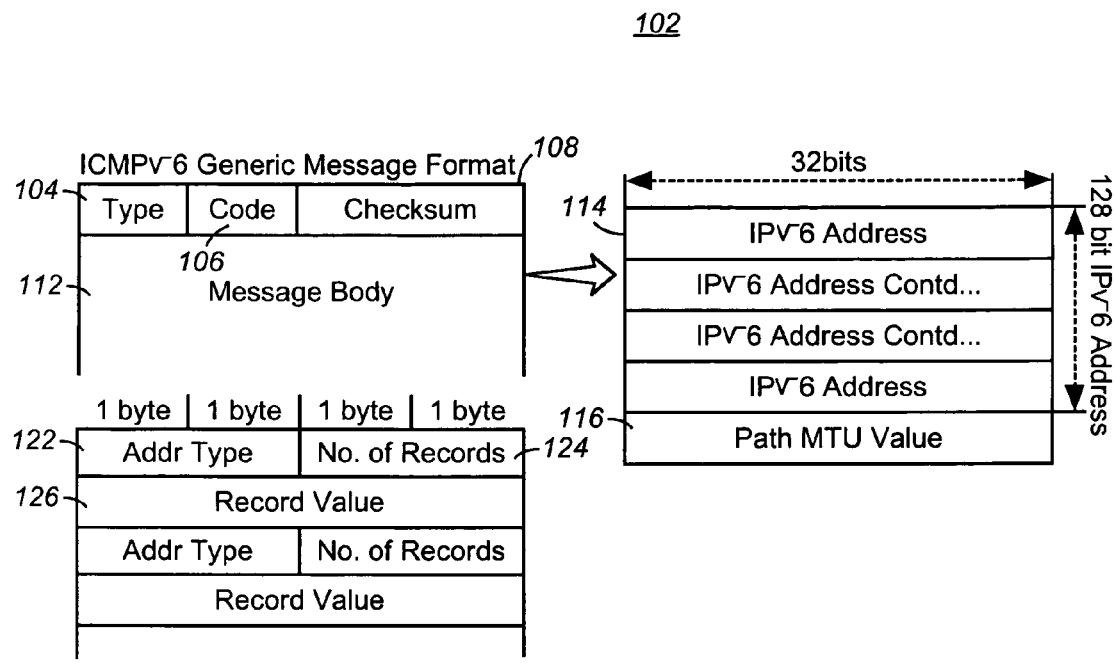
FIG. 3 illustrates the format of an exemplary notification message generated pursuant to an embodiment of the present invention.

FIG. 3 illustrates an exemplary format of an ICMPv6 message that is generated pursuant to an embodiment of the present invention by which to notify a mobile host of the determined path MTU indicating the maximum packet size permitted of packets generated by the mobile host without fragmentation. The message 102 includes a header part including a type field 104, a code field 106, and a checksum field 108. The message further includes a message body 112 populated with one or more IP addresses 114 and associated path MTU values 116. The message includes further fields including an address type field 122, a record number field 124, and a record value field 126.

Figure 4:
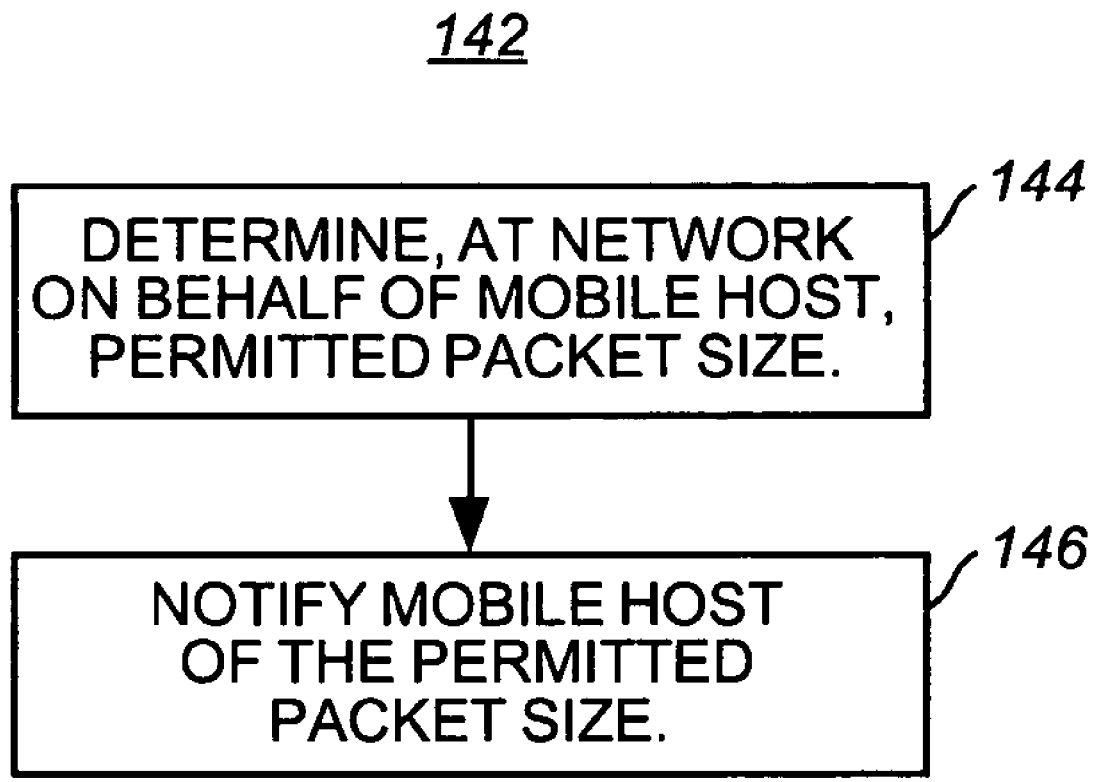
FIG. 4 illustrates a method flow diagram listing the method steps of the method of operation of an embodiment of the present invention.

FIG. 4 illustrates a method, shown generally at 142, of the method of operation of an embodiment of the present invention. The method facilitates communication of packet formatted data by a mobile host in unfragmented form to a correspondent host.

First, and as indicated by the block 144, a determination is made at the network part, on behalf of the mobile host, of at least a first packet size into which the packet formatted data is permitted to be formed for communication to the correspondent host. The first packet size permits communication of the packet formatted data in unfragmented form to the first correspondent host.

Then, and as indicated by the block 146, the mobile host is notified of the at least the first packet size permitted of the packet formatted data.

Because the determination is made at the network part of the communication system, lessened levels of radio resources are required pursuant to the permitted packet size discovery process. And, as the processing associated with the determination is performed at the network rather than at the mobile host, processing responsibility at the mobile host is alleviated.

The previous descriptions are of preferred examples for implementing the invention, and the scope of the invention should not necessarily be limited by this description. The scope of the present invention is defined by the following claims.

What is claimed is:

1. Apparatus for facilitating communication of packet-formatted data by a mobile-host of a packet radio communication system operable pursuant to an Internet Protocol (IP) and having a network part, the mobile host for communicating with at least a first correspondent host connected in communication connectivity with the network part, said apparatus comprising:

a network-positioned determiner adapted to receive an indication of initiation of communications by the mobile host, said network-positioned determiner configured to determine, on behalf of the mobile host and responsive to reception of the indication of the initiation of the communications, of at least a first packet-size into which the packet-formatted data is permitted to be formed for communication to the at least the first correspondent host, the at least the first packet size determined by said network-positioned determiner permitting communication of the packet formatted data in unfragmented form to the at least the first correspondent host.

2. The apparatus of claim 1 further comprising a notifier adapted to receive indications of determination of the at least the first packet size determiner by said network-positioned determiner, said notifier configured to notify the mobile host of the at least the first packet size permitted of the packet-formatted data to the at least the first correspondent host.

3. The apparatus of claim 2 wherein the Internet Protocol pursuant to which the radio communication system operates further comprises an Internet Message Control Protocol (IMCP) and wherein said notifier notifies the mobile host of the at least the first packet size permitted of the packet-formatted data with an Internet Message Control Protocol-formatted message.

4. The apparatus of claim 3 wherein the Internet Protocol pursuant to which the radio communication system operates comprises an IPng (Internet Protocol New Generation), and wherein the Internet Message Control Protocol-formatted message by which said notifier notifies the mobile host of the at least the first packet size permitted of the packet-formatted data comprises an IlvICPng (Internet Message Control Protocol New Generation)-formatted message.

5. The apparatus of claim 4 wherein the at least the first correspondent host comprises the first correspondent host and at least a second correspondent host, wherein said network-positioned determiner determines the first packet size and at least a second packet size, the second packet size indicative of how large that the packet-formatted data is permitted to be formed for communication to the second correspondent host, indications of the first packet size and the second packet size populating the IMCPng-formatted message.

6. The apparatus of claim 4 wherein the at least the first correspondent host is identified by at least a first packet address and wherein the IMCPng-formatted message further comprises an indication of the at least the first packet address of the at least the first correspondent host.

7. The apparatus of claim 4 wherein the IMCPng-formatted message comprises a Type Field and wherein the type field is populated with a selected value to indicate the IMCPng message to contain the at least the first packet size.

8. The apparatus of claim 1 wherein the at least the first correspondent host with which the mobile node communicates comprises the first correspondent host and at least a second correspondent host and wherein the at least the first packet-size determined by said network-positioned determiner comprises the first packet size into which the packet-formatted data is permitted to be formed for communication to the first correspondent host and at least the second packet size into which the packet-formatted data is permitted to be formed for communication to the at least the second correspondent host.

9. The apparatus of claim 8 wherein the first correspondent host is accessible by way of a first link during a selected interval, the first packet size determined by said network-based determiner further associated with the first link during the selected interval, and wherein the second correspondent host is accessible by way of a second link during the selected interval, the second packet size determined by said network-based determiner further associated with the second link during the selected interval.

10. The apparatus of claim 1 wherein said network-positioned determiner comprises a Path Maximum Transmit Unit determiner, and wherein the at least the first packet size determined by said Path Maximum Transmit Unit determiner comprises a first Path Maximum Transmit Unit associated with a communication link extending to the first correspondent host.

11. The apparatus of claim 1 wherein the mobile host indicates communication by generating a domain name server inquiry and wherein said network-positioned determiner operates responsive to generation of the domain name server inquiry generated by the mobile host.

12. The apparatus of claim 11 wherein the network part of the radio communication system comprises a domain name server, wherein the domain name server inquiry generated by the mobile host is routed to the domain name server and the domain name server generates a response thereto, and wherein said network-positioned determiner is operable responsive to the response generated by the domain name server.

13. The apparatus of claim 2 wherein the network part of the radio communication system comprises a packet data service node and wherein said network-positioned determiner and said notifier are embodied at the packet data service node.

14. The apparatus of claim 1 wherein the network part of the radio communication system comprises a radio network portion and a packet data network portion, the radio network portion and the packet data network portion interconnected by a connecting entity and wherein said network-positioned determiner is embodied a the connecting entity.

15. The apparatus of claim 1 further comprising a cache for cacheing values representative of the at least the at least the first packet size, the values cached thereat selectably retrievable therefrom to notify the mobile host of the at least the first packet size.

16. A method for facilitating communication of packet-formatted data by a mobile host of a packet radio communication system operable pursuant to an Internet Protocol (IP) and having a network part, the mobile host for communicating with at least a first correspondent host connected in communication connectivity with the network part, said method comprising the operations of:

detecting, at the network part, an indication of initiation of communications by the mobile host:

determining at the network part, on behalf of the mobile host, and responsive to detection made during said operation of detecting at least a first packet-size into which the packet formatted data is permitted to be formed for communication to the at least the first correspondent host, the at least the first packet size permitting communication of the packet formatted data in unfragmented form to the at least the first correspondent host; and notifying the mobile host of the at least the first packet size permitted of the packet formatted data and determined during said operation of determining.

17. The method of claim 16 wherein the Internet Protocol pursuant to which the packet radio communication system is operable defines an Internet Message Control Protocol and wherein said operation of notifying comprises sending an Internet Message Control Protocol-formatted message to the mobile host.

18. The method of claim 17 wherein said operation of determining comprises performing a Discover Maximum Transmit Unit (MTU) procedure at the network part of the radio communication system.

19. The method of claim 18 further comprising the operation of cacheing the at least the first packet size determined pursuant to the Discover Maximum Transmit Unit procedure.

* * * * *